United States Patent
Li

(10) Patent No.: US 11,403,117 B2
(45) Date of Patent: Aug. 2, 2022

(54) METHODS FOR PROCESSING MINI PROGRAM, AND RELATED DEVICES

(71) Applicant: BAIDU ONLINE NETWORK TECHNOLOGY (BEIJING) CO., LTD., Beijing (CN)

(72) Inventor: Xiaodong Li, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 163 days.

(21) Appl. No.: 16/993,232

(22) Filed: Aug. 13, 2020

(65) Prior Publication Data

US 2021/0149687 A1    May 20, 2021

(30) Foreign Application Priority Data

Nov. 18, 2019    (CN) .......................... 201911127585.2

(51) Int. Cl.
*G06F 9/445* (2018.01)
*H04L 67/00* (2022.01)

(52) U.S. Cl.
CPC ...... *G06F 9/44526* (2013.01); *G06F 9/44584* (2013.01); *H04L 67/34* (2013.01)

(58) Field of Classification Search
CPC ...... G06F 9/5055; G06F 9/44526; G06F 8/61; G06F 8/20; G06F 9/44584; H04L 67/34
See application file for complete search history.

(56) References Cited

U.S. PATENT DOCUMENTS

| 9,959,109 | B2 * | 5/2018 | Aw .......................... G06F 21/57 |
| 10,044,787 | B1 * | 8/2018 | Frazier .................... H04L 67/02 |
| 2004/0139223 | A1 * | 7/2004 | Caplin .................. G06Q 30/02 |
| | | | 709/237 |
| 2008/0140722 | A1 * | 6/2008 | Jakobovits ............. G16H 30/40 |
| 2008/0209556 | A1 * | 8/2008 | Fu ....................... G06F 9/44589 |
| | | | 726/22 |

(Continued)

FOREIGN PATENT DOCUMENTS

EP    3471388 A1    4/2019

OTHER PUBLICATIONS

European Patent Application No. 20190491.9 extended Search and Opinion dated Jan. 27, 2021, 9 pages.

*Primary Examiner* — Ninos Donabed
(74) *Attorney, Agent, or Firm* — Lathrop GPM LLP

(57) ABSTRACT

The disclosure provides methods for processing a mini program and related devices, and relates to mini program technologies in the field of computer technologies. The solution may include: accessing to a first application; determining whether the first application has a capability to be hosted by any mini program; when the first application has the capability to be hosted by any mini program, searching a target mini program matching with the first application in a mini program library, in which the mini program library includes at least one mini program; and sending mini program information of the target mini program to a second server; in which the second server is configured to provide a service of the first application and add the mini program information to the first application, and the mini program information is configured for the first application to run the target mini program.

9 Claims, 5 Drawing Sheets

(56) References Cited

U.S. PATENT DOCUMENTS

| | | | | |
|---|---|---|---|---|
| 2010/0312879 A1* | 12/2010 | Taieb | G06F 9/5055 | 709/224 |
| 2013/0080166 A1* | 3/2013 | Buffum | G10L 17/06 | 704/236 |
| 2014/0007204 A1* | 1/2014 | Branch | H04L 41/28 | 726/5 |
| 2015/0205955 A1* | 7/2015 | Turgeman | G06F 21/554 | 726/7 |
| 2015/0213251 A1* | 7/2015 | Turgeman | H04L 63/08 | 726/7 |
| 2015/0378673 A1* | 12/2015 | Hemphill | G06F 16/258 | 707/756 |
| 2019/0335017 A1* | 10/2019 | Gibis | G06Q 20/341 | |
| 2020/0396418 A1* | 12/2020 | Fink | H04L 67/18 | |

* cited by examiner

# METHODS FOR PROCESSING MINI PROGRAM, AND RELATED DEVICES

CROSS-REFERENCE TO RELATED APPLICATION

This application claims priority to Chinese Patent Application No. 201911127585.2, filed on Nov. 18, 2019, the entire contents of which are incorporated herein by reference.

TECHNICAL FIELD

The disclosure relates to mini program technologies in the field of computer technologies, and more particularly, to a method for processing a mini program, and a related device.

BACKGROUND

With the rapid development of Internet technologies, applications may be launched through corresponding clients installed in electronic devices for information interaction. However, this process is not convenient for people to obtain information, thus mini programs are developed. The mini programs are applications issued by servers and executable in specific containers without installation, which makes it more convenient for users to perform information interaction.

However, currently, the mini programs are usually distributed to the applications for running, which is usually set manually by developers of the applications. The operation process is complicated and cumbersome, which makes it difficult and disadvantageous to distribute the mini programs to the applications for running, resulting in low user traffic obtained from the mini programs. Therefore, the existing mini programs have a problem of low user traffic obtained.

SUMMARY

In a first aspect, the disclosure provides a method for processing a mini program. The method is applicable for a first server, and includes: accessing to a first application; determining whether the first application has a capability to be hosted by any mini program; when the first application has the capability to be hosted by any mini program, searching a target mini program matching with the first application in a mini program library, in which the mini program library includes at least one mini program; and sending mini program information of the target mini program to a second server; in which the second server is configured to provide a service of the first application and add the mini program information to the first application, and the mini program information is configured for the first application to run the target mini program.

In a second aspect, the disclosure provides a method for processing a mini program. The method is applicable for a second server. The second server is configured to provide a service of a first application, and the first application has a capability to be hosted by any mini program. The method includes: receiving mini program information of a target mini program from a first server, in which the target mini program is a mini program that is searched from a mini program library and matches with the first application when the first server accesses to the first application, and the mini program library includes at least one mini program; and adding the mini program information to the first application, so that the target mini program is executable by the first application.

In a third aspect, the disclosure provides a server. The server includes: at least one processor; and a memory connected in communication with the at least one processor. The memory stores instructions executable by the at least one processor. When the instructions are executed by the at least one processor, the at least one processor are caused to implement the method according to the first aspect or the second aspect.

The additional effects of the foregoing manners will be described below in combination with specific embodiments.

BRIEF DESCRIPTION OF THE DRAWINGS

The accompanying drawings are used to better understand the solution, and do not constitute a limitation on the disclosure, in which.

DETAILED DESCRIPTION

The following describes the exemplary embodiments of the disclosure with reference to the accompanying drawings, which includes various details of the embodiments of the disclosure to facilitate understanding. These details shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Figure 1:
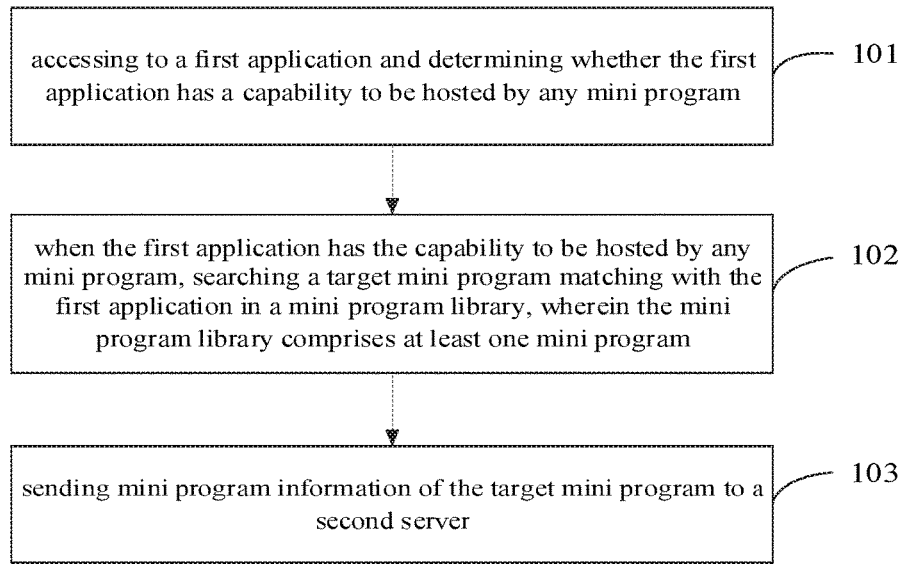
FIG. 1 is a flowchart of a method for processing a mini program according to an embodiment of the disclosure.

As illustrated in FIG. 1, embodiments of the disclosure provide a method for processing a mini program. The method may be applicable for a first server. The method includes the following.

At block 101, a first application is accessed to and it is determined whether the first application has a capability to be hosted by any mini program.

In the embodiment, the first server may access to the first application, and determine whether the first application has the capability to be hosted by any mini program.

The first server may access to the first application, that is, a second server may send an access request to the first server, and the access request is configured to instruct the first server to access to the first application. The second server is configured to provide a service of the first application.

In addition, the first application may be any application. If the first application has the capability to be hosted by any mini program, the first application may run the mini program based on the mini program information of the mini program that uses the first application as a host.

It is noted that the process of determining whether the first application has the capability to be hosted by any mini program may be a process of determining by the first server whether the first application has indication information. The indication information is configured to indicate that the first application has the capability to be hosted by any mini program. In detail, the indication information may be a unique host identifier. If the first application has the indication information, it is confirmed that the first application has the capability to be hosted by any mini program, otherwise, the first application does not have the capability to be hosted by any mini program.

At block 102, when the first application has the capability to be hosted by any mini program, a target mini program matching with the first application is searched in a mini program library.

In this embodiment, at least one mini program and related information of each mini program may be pre-stored in the mini program library of the first server, that is, the mini program library includes at least one mini program. Under the circumstance that the first server is accessed to the first application capable of being hosted by any mini program, the first server may search the target mini program matching with the first application in the mini program library. Here, the above mini program library may be a database in the first server, or may be a database outside of the first server, for example, a cloud database, which is not limited herein.

The target mini program matching with the first application is searched in the mini program library, according to matching information. The matching information is carried in a message from the first application during the processing of accessing to the first application by the server and obtained by the first server. The mini program in the mini program library with relevant information matching with the matching information of the first application is determined as the target mini program. The matching information of the first application may include at least one of: a material type of the mini program, host information, and a material template.

For example, in the case where the matching information of the first application described above is configured to indicate the material type of video-on-demand, the first server searches the mini program library for the mini program with the material type of video-on-demand, and the mini program searched is determined to be the above target mini program.

It should be noted that the above target mini program may be one or more mini programs.

In this embodiment, the first application has the capability to be hosted by any mini program, which may be that the first server may configure the accessed first application to be capable of being hosted by any mini program. In detail, after the block 101, the method further includes the following.

When the first application does not have the capability to be hosted by any mini program, configuration information is sent to the second server. The configuration information is configured for the second server to configure the first application with the capability to be hosted by any mini program.

The first server may send the configuration information to the second server, so that based on the configuration information, the second server may configure an application (i.e., the first application) that does not have the capability to be hosted by any mini program as an application having the capability to be hosted by any mini program, which can increase the number of applications that can be distributable for each mini program, making the mini program's distribution range wider, that is, increasing the number of channels for the mini program to obtain user traffic, which can improve user traffic obtained by the mini program.

In this embodiment, the second server may receive the configuration information and configure the first application with the capability to be hosted by any mini program based on the configuration information, so that the first application can run any matching mini program.

The above configuration information may be any information that enables the second server to configure the first application with the above-mentioned capability to be hosted by any mini program. In detail, the configuration information includes a host unique identifier, a client software development kit (SDK), a front-end SDK, an expansion capability package, calling protocol rules, a uniform resource locator (URL) of a provider, and the like.

The host unique identifier is further configured to identify that the first application has the capability to be hosted by any mini program. The host unique identifier and the calling protocol rules are configured to splice calling protocols, and the calling protocols are configured to call and render any mini program. The client SDK and the front-end SDK are configured as a container to run any mini program, specifically, configured for mini program package downloading, mini program loading, mini program framework translation and rendering, and channels for interacting with the client SDK. The URL is configured to instruct the client SDK and the front-end SDK to obtain corresponding mini program information from the URL. The expansion capability package is configured to manage capabilities and components of application programming interface (APIs) of the first application, as well as private expansion capabilities of the first application.

In addition, the process of the second server configuring the above-mentioned capability of being able to be hosted by any mini program for the first application based on the configuration information may include: splicing calling protocols through the host unique identifier and calling protocol rules; writing the calling protocols and the URL of the provider to a configuration file of a target path, in which the target path is a specific path recognized by the SDK; writing the client SDK, the front-end SDK, and the expansion capability package to a project directory of a project of the first application; and adding related codes of the environment when the mini program is initialized for running, in the project of the first application, so that when the user clicks on the certain mini program on the first application, spliced protocols are called dynamically and passed to the client SDK and the front-end SDK, and the client SDK and the front-end SDK call and render the corresponding mini programs and pages through the spliced protocols.

It is noted that after the first server sends the configuration information to the second server, since the second server can configure the first application to be capable of being hosted by any mini program based on the configuration information, the first application has the capability to be hosted by any mini program, so the first server can continue to perform actions at blocks 102 and 103.

At block 103, mini program information of the target mini program is sent to the second server.

The second server is configured to provide a service of the first application and add the mini program information to the first application, and the mini program information is configured for the first application to run the target mini program.

The second server can receive the above mini program information, and add (e.g., write) the mini program information to the first application, so that the target mini program can be distributed to the first application to run, thereby making the process of distributing the mini program to the application for running on the application convenient and time-saving, reducing the difficulty of distributing the mini program to the application, and facilitating the distribution of the mini program, thus the user traffic obtained by the mini programs is increased.

In this embodiment, the above-mentioned process of sending the mini program information of the target mini program to the second server may be that after the first server determines the target mini program, the first server first pulls the target mini program into a material library associated with the first application, and regularly sends the mini program information of at least one mini program in the material library (the target mini program is any mini program in the at least one mini program) to the second server. Therefore, the number of communications with the second server can be reduced, and the resource overhead of the first server can be saved.

Certainly, sending the mini program information of the target mini program to the second server may refer to sending the mini program information of a single mini program matching with the first application to the second server, which is not limited herein.

The mini program information of the target mini program may be any information that enables the first application to run the target mini program. In detail, the mini program information may include material information of part or all of the materials of the target mini program. The material information includes a service type and service content for describing the materials of the mini program. When the mini program information includes material information of all the materials, the first application can run and display all materials of the target mini program, and when the mini program information includes material information of some materials, the first application may run and display some materials of the target mini program.

It is noted that, in the case where the above-mentioned first server searches the mini program matching with the first application in the mini program library, the first server may send the mini program information of any searchable mini program in the mini program library to the second server.

Alternatively, block 103 may include: sending a first request to a developer end for developing the target mini program; and in response to receiving a confirmation result feedback from the developer end based on the first request, sending the mini program information of the target mini program to the second server. The confirmation result is configured to confirm that the target mini program is a mini program executable by the first application.

After receiving the confirmation result of the developer end for the target mini program, the first server sends the mini program information of the target mini program to the second server, that is, after the first server determines the target mini program matching with the first application, the developer end needs to confirm the target mini program before realizing the target mini program as an executable mini program of the first application, and the bidirectional selection of the first server and the developer end is realized, so that the mini program can be distributed to the suitable application for running.

In this embodiment, the above-mentioned first request may be a request for instructing the developer end to confirm whether to determine the target mini program as a mini program executable by the first application.

In addition, the above-mentioned confirmation result feedback by the developer end based on the first request may be generated according to the input operation of the developer. In detail, when the first request is received by the developer end, the developer platform of the developer end may output the selection result for indicating that the first server selects the target mini program as the mini program matching with the first application. When the developer end receives the confirmation operation input by the developer on the developer platform based on the selection result, the confirmation result is generated (that is, the target mini program is proved as the mini program running on the first application). Certainly, when the developer end receives the rejection confirmation operation input by the developer, an unconfirmed result is generated (that is, the target mini program is not agreed as the mini program running on the first application).

Certainly, the above-mentioned confirmation result feedback by the developer end based on the first request may be generated automatically by the developer end according to a preset rule or policy. In detail, when the first application is a preset application, and/or, when the material information of the target mini program matches with the preset material information, the confirmation result is generated.

For ease of understanding, the embodiments of the disclosure also provide a practical application process of the above method for processing the mini program, which is as follows.

Figure 2:
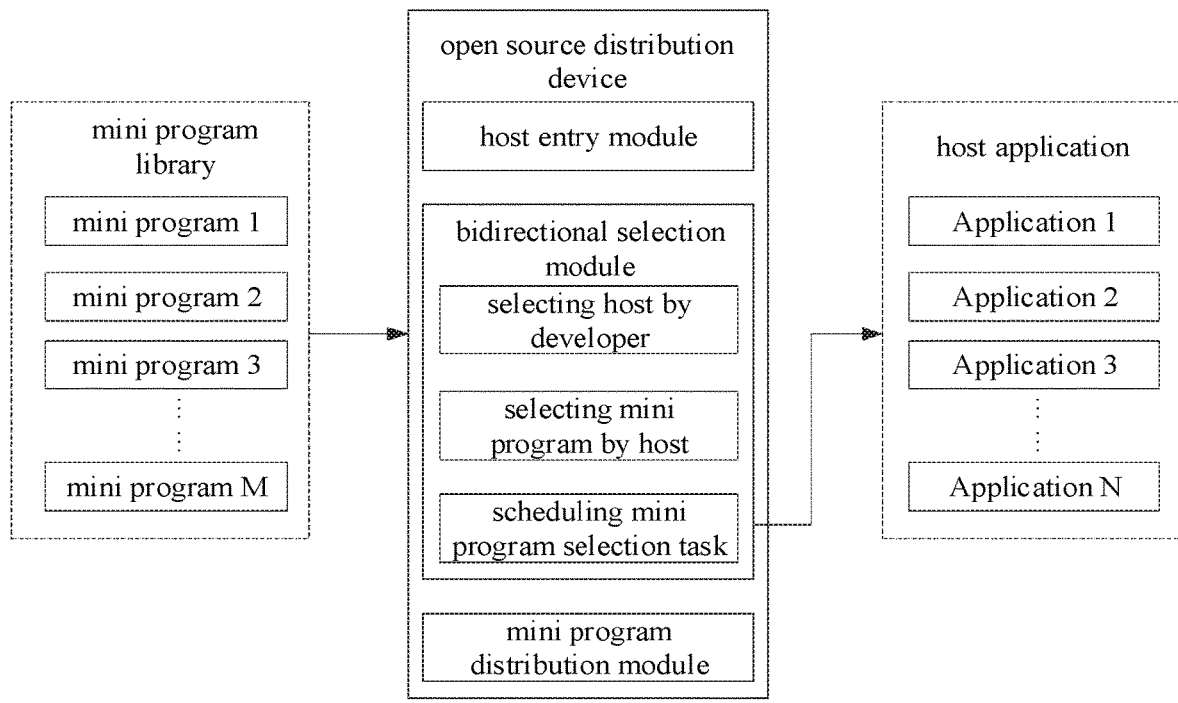
FIG. 2 is a schematic diagram of an open source distribution device according to an embodiment of the disclosure.

As illustrated in FIG. 2, the open source distribution device (that is, the above-mentioned first server) includes a host entry module, a bidirectional selection module, and a mini program distribution module. The host entry module is configured to access to the application that does not have the capability to be hosted by any mini program, and send configuration information to the server (that is, the second server) of the accessed application, so that the accessed application has the capability to be hosted by any mini program (that is, configure the accessed application as the host application). For example, if any of the applications 1 to N can be implemented with the capability to be hosted by any mini program, N is a positive integer. When a certain application (i.e., the first application) is accessed to by the host entry module, the bidirectional selection module is configured to find the mini program (i.e., the target mini program) that matches with the first application in the mini program library, for example, determine at least one mini program in the mini programs 1 to M as the target mini program according to the material type of the mini program, the target channel for distribution, or the material template, to realize the function of selecting the mini program by the host in the bidirectional selection module, in which M is a positive integer. In addition, after finding the target mini program, the bidirectional selection module is also configured to send the selection result of the target mini program to the developer platform of the developer end to notify the developer to confirm whether the mini program should be distributed on the first application, and receive the confirmation result returned by the developer end, so as to realize the function of selecting the host by the developer in the bidirectional selection module. In the case of the confirmation result returned by the developer end, the bidirectional selection module is also configured to periodically pull the mini program from the mini program library to the mini program distribution module according to the confirmation result and the selection task, thereby realizing the function of scheduling the mini program selection task in the bidirectional selection module. The mini program distribution module is configured to send the mini program information of the mini program pulled by the bidirectional selection module to the server of the first application, so that the target mini program can be distributed and run on the first application. Therefore, the operation process of distributing the mini program to the application is convenient and time-saving, and the number of applications that can run the mini program is increased, thereby improving the user traffic obtained by the mini programs.

In the embodiments, when the accessed first application has the capability to be hosted by any mini program, the target mini program matching with the first application is searched in the mini program library, in which the mini program library includes at least one mini program; the mini program information of the target mini program is sent to the second server, and the second server is configured to provide the service of the first application and add the mini program information to the first application, and the mini program information is configured for the first application to run the target mini program. Therefore, the first server can be configured to distribute the target mini program to the first application, which makes the operation of distributing the mini program to the application easy and time-saving, reduces the difficulty of distributing the mini program to the application, and facilitates the distribution of the mini program, thereby increasing the user traffic obtained by the mini program.

Figure 3:
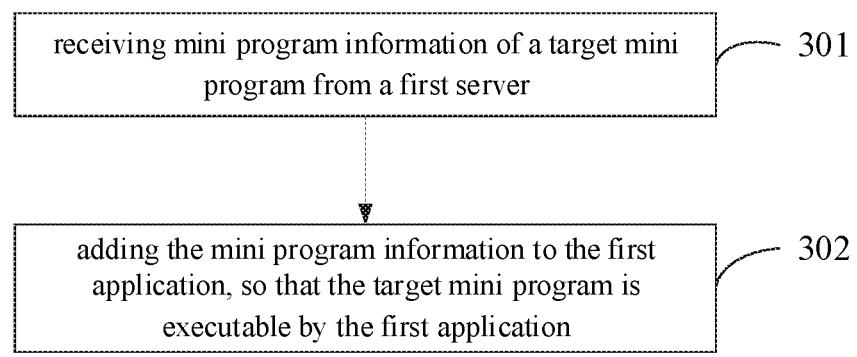
FIG. 3 is a flowchart of a method for processing a mini program according to an embodiment of the disclosure.

As illustrated in FIG. 3, the embodiments of the disclosure provide another method for processing a mini program. The method is applicable for a second server. The second server is configured to provide a service of a first application, and the first application has a capability to be hosted by any mini program. As illustrated in FIG. 3, the method includes the following.

At block 301, mini program information of a target mini program is received from a first server, in which the target mini program is a mini program that is searched from a mini program library and matches with the first application when the first server accesses to the first application, and the mini program library includes at least one mini program.

At block 302, the mini program information is added to the first application, so that the target mini program is executable by the first application.

Optionally, before block 301, the method further includes: receiving configuration information from the first server; and based on the configuration information, configuring the first application with the capability to be hosted by any mini program.

Optionally, the configuration information includes a host unique identifier, a client software development kit (SDK), a front-end software development kit (SDK), an expansion capability package, calling protocol rules, and a uniform resource locator (URL) of a provider.

It is noted that this embodiment is an implementation of the second server corresponding to the method embodiment of FIG. 1. Therefore, the method can be referred to the related description in the above method embodiments, and the same beneficial effects can be achieved. In order to avoid repeating the description, the method is not repeated herein.

Figure 4:
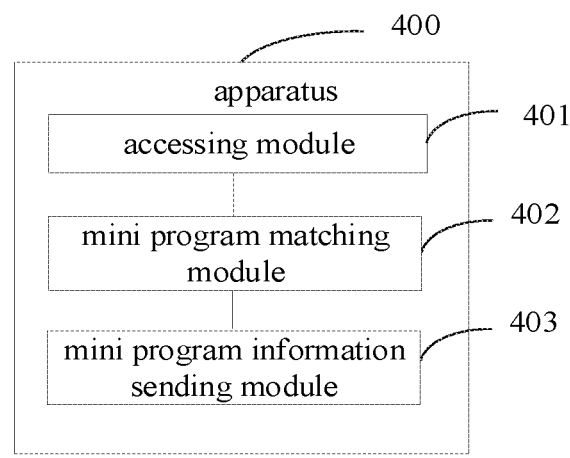
FIG. 4 is a block of an apparatus for processing a mini program according to an embodiment of the disclosure.

As illustrated in FIG. 4, the embodiments of the disclosure provide an apparatus for processing a mini program. The apparatus is applicable for a first server. The apparatus 400 includes an accessing module 401, a mini program matching module 402, and a mini program information sending module 403.

The accessing module 401 is configured to access to a first application and determine whether the first application has a capability to be hosted by any mini program.

The mini program matching module 402 is configured, when the first application has the capability to be hosted by any mini program, search a target mini program matching with the first application in a mini program library. The mini program library includes at least one mini program.

The mini program information sending module 403 is configured to send mini program information of the target mini program to a second server. The second server is configured to provide a service of the first application and add the mini program information to the first application, and the mini program information is configured for the first application to run the target mini program.

Figure 5:
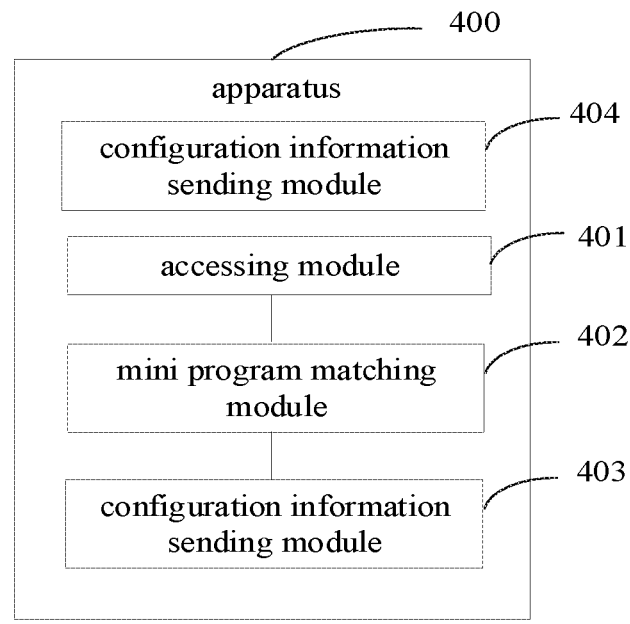
FIG. 5 is a block of an apparatus for processing a mini program according to an embodiment of the disclosure.

Optionally, as illustrated in FIG. 5, the apparatus 400 further includes: a configuration information sending module 404, configured, when the first application does not have the capability to be hosted by any mini program, send configuration information to the second server. The configuration information is configured for the second server to configure the first application with the capability to be hosted by any mini program.

Optionally, the configuration information includes a host unique identifier, a client software development kit (SDK), a front-end software development kit (SDK), an expansion capability package, calling protocol rules, and a uniform resource locator (URL) of a provider.

The host unique identifier and the calling protocol rules are configured to splice calling protocols, and the calling protocols are configured to call and render mini programs; and the client software development kit and the front-end software development kit are configured as a container for running the mini programs.

Figure 6:
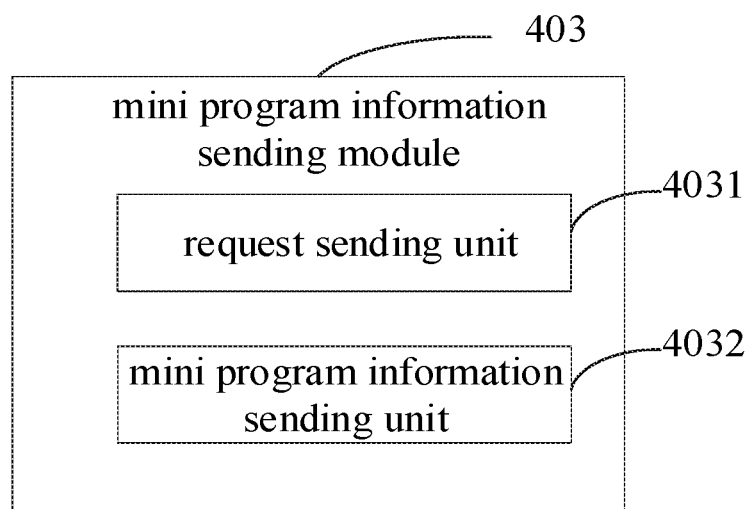
FIG. 6 is a block of an apparatus for processing a mini program according to an embodiment of the disclosure.

Optionally, as illustrated in FIG. 6, the mini program information sending module 403 includes: a request sending unit 4031, and a mini program information sending unit 4032.

The request sending unit 4031 is configured to send a first request to a developer end for developing the target mini program.

The mini program information sending unit 4032 is configured to, in response to receiving a confirmation result feedback from the developer end based on the first request, send the mini program information of the target mini program to the second server, in which the confirmation result is configured to confirm that the target mini program is a mini program executable by the first application.

It is noted that the apparatus 400 can implement various processes implemented by the first server in the method embodiments of FIGS. 1 to 3 of the disclosure, and achieve the same beneficial effects. To avoid repetition, details are not described here.

Figure 7:
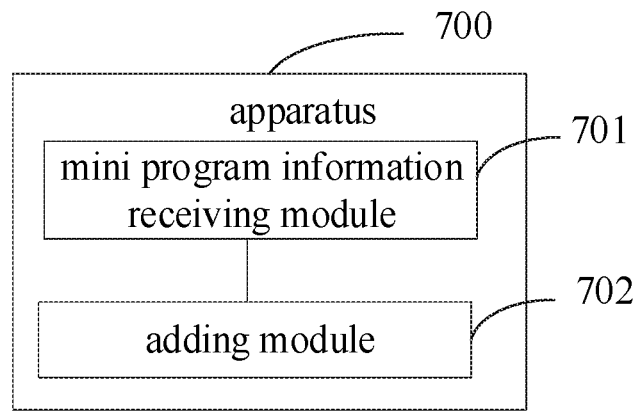
FIG. 7 is a block of an apparatus for processing a mini program according to an embodiment of the disclosure.

As illustrated in FIG. 7, the embodiments of the disclosure provide another apparatus for processing a mini program. The apparatus is applicable for a second server. The second server is configured to provide a service of a first application, and the first application has a capability to be hosted by any mini program. The apparatus 700 includes: a mini program information receiving module 701, and an adding module 702.

The mini program information receiving module 701 is configured to receive mini program information of a target mini program from a first server, in which the target mini program is a mini program that is searched from a mini program library and matches with the first application when the first server accesses to the first application, and the mini program library includes at least one mini program.

The adding module 702 is configured to add the mini program information to the first application, so that the target mini program is executable by the first application.

Figure 8:
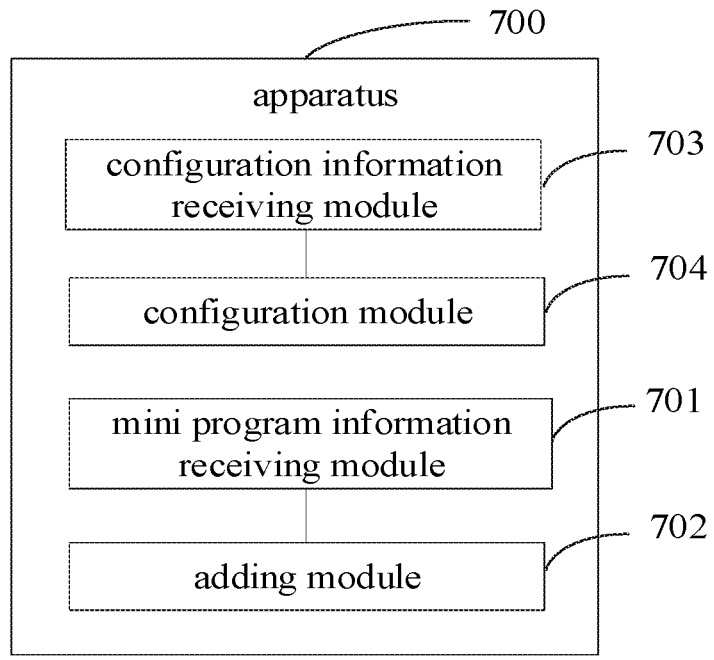
FIG. 8 is a block of an apparatus for processing a mini program according to an embodiment of the disclosure.

Optionally, as illustrated in FIG. 8, the apparatus 700 further includes: a configuration information receiving module 703, and a configuration module 704.

The configuration information receiving module 703 is configured to receive configuration information from the first server.

The configuration module 704 is configured to, based on the configuration information, configure the first application with the capability to be hosted by any mini program.

Optionally, the configuration information includes a host unique identifier, a client software development kit (SDK), a front-end software development kit (SDK), an expansion capability package, calling protocol rules, and a uniform resource locator (URL) of a provider.

The host unique identifier and the calling protocol rules are configured to splice calling protocols, and the calling protocols are configured to call and render mini programs; and the client SDK and the front-end SDK are configured as a container for running the mini programs.

It is noted that the apparatus 700 can implement various processes implemented by the second server in the method embodiments of FIGS. 1 to 3 of the disclosure and achieve the same beneficial effects.

According to the embodiment of the disclosure, the disclosure further provides a server (which may be the above-mentioned first server or second server) and a readable storage medium.

Figure 9:
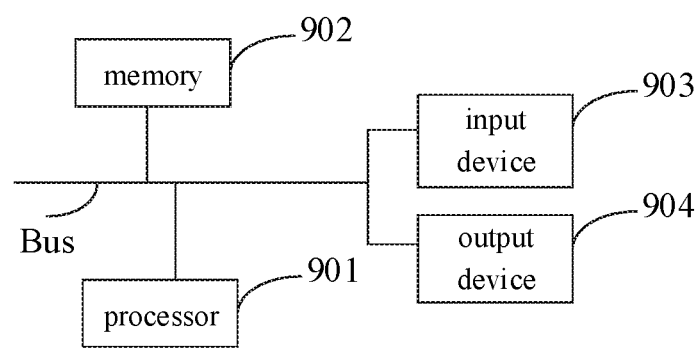
FIG. 9 is a block diagram of a server for implementing a method for processing a mini program according to an embodiment of the disclosure.

FIG. 9 is a block diagram of a server for implementing a method for processing a mini program (the method for processing the mini program as illustrated in FIG. 1 or 3) according to an embodiment of the disclosure. The servers are intended to represent various forms of digital computers, such as laptop computers, desktop computers, workbenches, personal digital assistants, servers, blade servers, mainframe computers, and other suitable computers. The servers may also represent various forms of mobile devices, such as personal digital processing, cellular phones, smart phones, wearable devices, and other similar computing devices. The components shown here, their connections and relations, and their functions are merely examples, and are not intended to limit to the implementation of the disclosure described and/or required herein.

As illustrated in FIG. 9, the server includes: one or more processors 901, a memory 902, and interfaces for connecting various components, including high-speed interfaces and low-speed interfaces. The various components are interconnected using different buses and can be mounted on a common mainboard or otherwise installed as required. The processor may process instructions executed within the server, including instructions stored in the memory or on the memory to display graphical information of the GUI (Graphical User Interface) on an external input/output device such as a display device coupled to the interface. In other embodiments, a plurality of processors and/or buses can be used with a plurality of memories and processors, if desired. Similarly, a plurality of servers can be connected, each providing some of the necessary operations (for example, as a server array, a group of blade servers, or a multiprocessor system). A processor 901 is taken as an example in FIG. 9.

The memory 902 is a non-transitory computer-readable storage medium according to the disclosure. The memory stores instructions executable by at least one processor, so that the at least one processor executes the method for processing a mini program according to the disclosure. The non-transitory computer-readable storage medium of the disclosure stores computer instructions that are configured to cause a computer to execute the method for processing the mini program according to the disclosure (the method as illustrated in FIG. 1 or 3).

As the non-transitory computer-readable storage medium, the memory 902 is configured to store non-transitory software programs, non-transitory computer executable programs and modules, such as program instructions/modules corresponding to the method for processing the mini program in the embodiment of the disclosure (For example, the accessing module 401, and the mini program matching module 402 shown in FIG. 4; or the mini program information receiving module 701, and the adding module 702 shown in FIG. 7). The processor 901 executes various functional applications and data processing of the server by running non-transitory software programs, instructions, and modules stored in the memory 902, that is, implementing the method for processing the mini program in the foregoing embodiment of FIG. 1 or 3.

The memory 902 may include a storage program area and a storage data area, where the storage program area may store an operating system and application programs required for at least one function. The storage data area may store data created according to the use of the server for processing the mini programs, and the like. In addition, the memory 902 may include a high-speed random-access memory, and a non-transitory memory, such as at least one magnetic disk storage device, a flash memory device, or other non-transitory solid-state storage device. In some embodiments, the memory 902 may optionally include a memory remotely disposed with respect to the processor 901, and these remote memories may be connected to the server for processing the mini program through a network. Examples of the above network include, but are not limited to, the Internet, an intranet, a local area network, a mobile communication network, and combinations thereof.

The server for processing the mini program may further include an input device 903 and an output device 904. The processor 901, the memory 902, the input device 903, and the output device 904 may be connected through a bus or in other manners. In FIG. 9, the connection through the bus is taken as an example.

The input device 903 may receive inputted numeric or character information, and generate key signal inputs related to user settings and function control of server for processing the mini program, such as a touch screen, a keypad, a mouse, a trackpad, a touchpad, an indication rod, one or more mouse buttons, trackballs, joysticks and other input devices. The output device 904 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general-purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (egg, a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

With the technical embodiments of the disclosure, the first application is accessed to, and it is determined whether the first application has the capability to be hosted by any mini program. When the first application has the capability to be hosted by any mini program, the target mini program matching with the first application is searched in the mini program library, in which the mini program library includes at least one mini program. The mini program information of the target mini program is sent to the second server, in which the second server is configured to provide the service of the first application and add the mini program information to the first application, and the mini program information is configured for the first application to run the target mini program. The first server automatically distributes the mini program matching with the application from the mini program library, thus the technical problem of low user traffic obtained by the mini program is overcome. Therefore, the operation process of distributing the mini program to the application is convenient and time-saving, such that the difficulty of distributing the mini program to the application is reduced, and it is conducive to the distribution of the mini program, thereby improving the technical effect of user traffic obtained by the mini program.

In addition, by sending the configuration information, it is possible to configure an application without the capability to be hosted by any mini program (i.e., the first application) to be capable of being hosted by any mini program. Therefore, the number of applications that can be distributable for each mini program can be increased, so that the distribution range of the mini program is wider, that is, the number of the channels through which the mini program obtains user traffic is increased, and thus the user traffic obtained the mini program is improved.

When receiving the confirmation result of the target mini program from the developer end, the mini program information of the target mini program is sent, the bidirectional selection between the first server and the developer end can be realized, so that the mini program can be distributed to a proper application for running.

It should be understood that the various forms of processes shown above can be used to reorder, add, or delete steps. For example, the steps described in this disclosure can be executed in parallel, sequentially, or in different orders, as long as the desired results of the technical solutions disclosed in this disclosure can be achieved, which is no limited herein.

The foregoing specific implementations do not constitute a limitation on the protection scope of the present disclosure. It should be understood by those skilled in the art that various modifications, combinations, sub-combinations, and substitutions may be made according to design requirements and other factors. Any modification, equivalent replacement and improvement made within the spirit and principle of this disclosure shall be included in the protection scope of this disclosure.

What is claimed is:

1. A method for processing a mini program, applicable for a first server, and comprising:
   accessing to a first application;
   determining whether the first application has a capability to be hosted by any mini program, wherein the mini program is an application issued by a server and executable in specific containers without installation;
   when the first application has the capability to be hosted by any mini program,
      searching a target mini program matching with the first application in a mini program library, the mini program library comprising at least one mini program; and
      sending mini program information of the target mini program to a second server, wherein, the second server is configured to provide a service of the first application and add the mini program information to the first application, and the mini program information is configured for the first application to run the target mini program; and when the first application does not have the capability to be hosted by any mini program, sending configuration information to the second server, the configuration information being configured for the second server to configure the first application with the capability to be hosted by any mini program;

wherein the configuration information comprises a host unique identifier, a client software development kit (SDK), a front-end software development kit (SDK), an expansion capability package, calling protocol rules, and a uniform resource locator (URL) of a provider; and the host unique identifier and the calling protocol rules are configured to splice calling protocols; the calling protocols are configured to call and render mini programs; and the client software development kit and the front-end software development kit are configured as a container for running the mini programs.

2. The method according to claim 1, determining whether the first application has the capability to be hosted by any mini program, comprising:

determining whether the first application has indication information, the indication information being configured to indicate that the first application has the capability to be hosted by any mini program.

3. The method according to claim 2, wherein the indication information comprises a unique host identifier.

4. The method according to claim 1, sending the mini program information of the target mini program to the second server, comprising:

sending a first request to a developer end for developing the target mini program; and in response to receiving a confirmation result feedback from the developer end based on the first request, sending the mini program information of the target mini program to the second server, the confirmation result being configured to confirm that the target mini program is a mini program executable by the first application.

5. A method for processing a mini program, applicable for a second server, wherein the second server is configured to provide a service of a first application, the method comprises:

when the first application has the capability to be hosted by any mini program, wherein the mini program is an application issued by a server and executable in specific containers without installation:

receiving mini program information of a target mini program from a first server, the target mini program being a mini program that is searched from a mini program library and matches with the first application when the first server accesses to the first application, and the mini program library comprising at least one mini program; and adding the mini program information to the first application, so that the target mini program is executable by the first application; and when the first application does not have the capability to be hosted by any mini program:

receiving configuration information from the first server; and based on the configuration information, configuring the first application with the capability to be hosted by any mini program;

wherein the configuration information comprises a host unique identifier, a client software development kit (SDK), a front-end software development kit (SDK), an expansion capability package, calling protocol rules, and a uniform resource locator (URL) of a provider; and the host unique identifier and the calling protocol rules are configured to splice calling protocols; the calling protocols are configured to call and render mini programs; and the client software development kit and the front-end software development kit are configured as a container for running the mini programs.

6. A server, comprising:

at least one processor; and a memory connected in communication with the at least one processor, and configured to store instructions executable by the at least one processor; wherein, the least one processor is configured to execute the instructions to implement a method for processing a mini program, the method comprising:

accessing to a first application;

determining whether the first application has a capability to be hosted by any mini program, wherein the mini program is an application issued by a server and executable in specific containers without installation;

when the first application has the capability to be hosted by any mini program, searching a target mini program matching with the first application in a mini program library, the mini program library comprising at least one mini program; and sending mini program information of the target mini program to another server, wherein, the another server is configured to provide a service of the first application and add the mini program information to the first application, and the mini program information is configured for the first application to run the target mini program; and when the first application does not have the capability to be hosted by any mini program, sending configuration information to the another server, the configuration information being configured for the another server to configure the first application with the capability to be hosted by any mini program;

wherein the configuration information comprises a host unique identifier, a client software development kit (SDK), a front-end software development kit (SDK), an expansion capability package, calling protocol rules, and a uniform resource locator (URL) of a provider; and the host unique identifier and the calling protocol rules are configured to splice calling protocols; the calling protocols are configured to call and render mini programs; and the client software development kit and the front-end software development kit are configured as a container for running the mini programs.

7. The server according to claim 6, determining whether the first application has the capability to be hosted by any mini program, comprising:

determining whether the first application has indication information, the indication information being configured to indicate that the first application has the capability to be hosted by any mini program.

8. The server according to claim 7, wherein the indication information comprises a unique host identifier.

9. The server according to claim 6, sending the mini program information of the target mini program to the another server, comprising:
- sending a first request to a developer end for developing the target mini program; and
- in response to receiving a confirmation result feedback from the developer end based on the first request, sending the mini program information of the target mini program to the another server, the confirmation result being configured to confirm that the target mini program is a mini program executable by the first application.

* * * * *